US010725460B2

(12) United States Patent
Kashiwagi et al.

(10) Patent No.: US 10,725,460 B2
(45) Date of Patent: Jul. 28, 2020

(54) CELL PRODUCTION SYSTEM INCLUDING MANUFACTURING CELL FOR AUTONOMOUS MANUFACTURING

(71) Applicant: FANUC CORPORATION, Yamanashi (JP)

(72) Inventors: Itsusei Kashiwagi, Yamanashi (JP); Nobutomo Itani, Yamanashi (JP); Yuuji Kounosu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/611,747

(22) Filed: Jun. 1, 2017

(65) Prior Publication Data
US 2017/0371323 A1 Dec. 28, 2017

(30) Foreign Application Priority Data

Jun. 24, 2016 (JP) .................................. 2016-125623

(51) Int. Cl.
*G05B 19/418* (2006.01)
(52) U.S. Cl.
CPC .................. *G05B 19/41865* (2013.01); *G05B 2219/32266* (2013.01); *G05B 2219/32268* (2013.01); *G05B 2219/32365* (2013.01); *Y02P 90/18* (2015.11); *Y02P 90/20* (2015.11); *Y02P 90/26* (2015.11)
(58) Field of Classification Search
CPC .... G05B 19/41865; G05B 2219/32268; G05B 2219/32266; G05B 2219/32365; Y02P 90/02; Y02P 90/30
See application file for complete search history.

(56) References Cited

U.S. PATENT DOCUMENTS

| 6,976,033 | B2* | 12/2005 | Yang | G06Q 10/06 |
| 7,380,213 | B2* | 5/2008 | Pokorny | B23Q 35/12 |
| | | | | 345/440 |
| 7,840,449 | B2* | 11/2010 | Ebel | G06Q 10/087 |
| | | | | 705/28 |
| 2002/0122582 | A1* | 9/2002 | Masuda | G01N 21/88 |
| | | | | 382/141 |
| 2004/0133310 | A1 | 7/2004 | Watanabe et al. | |
| 2010/0139222 | A1* | 6/2010 | Federle | B65B 57/14 |
| | | | | 53/474 |

(Continued)

FOREIGN PATENT DOCUMENTS

| CN | 1714323 A | 12/2005 |
| CN | 104220943 A | 12/2014 |

(Continued)

*Primary Examiner* — Mohammad Ali
*Assistant Examiner* — David Earl Ogg
(74) *Attorney, Agent, or Firm* — Hauptman Ham, LLP (57) ABSTRACT

A cell controller in each manufacturing cell includes a manufacturing instruction determination part that determines the types of manufacturable parts to be preferentially manufactured and the number of parts to be manufactured, based on order information and inventory information that are stored in the storage part of an administrative server, the manufacturing instruction determination part indicating the determination to a drive controller. In a cell production system configured thus, each manufacturing cell can timely manufacture multiple types of parts according to a status change of, for example, a part order or the inventory of materials.

6 Claims, 5 Drawing Sheets

(56) References Cited

U.S. PATENT DOCUMENTS

2011/0282476 A1* 11/2011 Hegemier ............ G06Q 10/087
                                                          700/100
2017/0185076 A1    6/2017 Yamamoto et al.
2017/0343994 A1   11/2017 Nishi et al.

FOREIGN PATENT DOCUMENTS

| CN | 105302104 A    | 2/2016  |
| DE | 102016124784 A1| 6/2017  |
| DE | 102017111201 A1| 11/2017 |
| JP | H3-117543 A    | 5/1991  |
| JP | H5-135065 A    | 6/1993  |
| JP | 2000-280151 A  | 10/2000 |
| JP | 2006-18576 A   | 1/2006  |
| JP | 2007-128368 A  | 5/2007  |

* cited by examiner

FIG. 2A

DATA TABLE OF ORDER INFORMATION

| Order number | Model number | Delivery date | Ordered number of parts | Indicated number of parts | Number of non-defective parts | Material list | Maximum number of lots |
|---|---|---|---|---|---|---|---|
| 1 | A | x month, x day | x pcs | x pcs | x pcs | List 1 | x pcs |
| 2 | B | x month, x day | x pcs | x pcs | x pcs | List 2 | x pcs |
| 3 | C | x month, x day | x pcs | x pcs | x pcs | List 3 | x pcs |
| .. | .. | .. | .. | .. | .. | .. | .. |

FIG. 2B

DATA TABLE OF MATERIAL INVENTORY INFORMATION

| List number | Material number | Number of stocked materials | Material list |
|---|---|---|---|
| List 1 | a1 | x pcs | List 1-1 |
| | a2 | x pcs | List 1-2 |
| | a3 | x pcs | List 1-3 |
| List 2 | b1 | x pcs | List 2-1 |
| | b2 | x pcs | List 2-2 |
| List 3 | c1 | x pcs | List 3-1 |
| | c2 | x pcs | List 3-2 |
| .. | .. | .. | .. |

| List number | Material number | Number of stocked materials | Material list |
|---|---|---|---|
| List 1-1 | a'1 | x pcs | List 1-1-1 |
| | a'2 | x pcs | List 1-1-2 |
| | a'3 | x pcs | List 1-1-3 |
| | a'4 | x pcs | List 1-1-4 |
| | a'5 | x pcs | List 1-1-5 |
| List 1-2 | b'1 | x pcs | List 1-2-1 |
| | b'2 | x pcs | List 1-2-2 |
| .. | .. | .. | .. |

CELL PRODUCTION SYSTEM INCLUDING MANUFACTURING CELL FOR AUTONOMOUS MANUFACTURING

RELATED APPLICATIONS

The present application claims priority to Japanese Patent Application No. 2016-125623 filed Jun. 24, 2016, the disclosure of which is hereby incorporated by reference herein in its entirety.

BACKGROUND OF THE INVENTION

1. Field of the Invention

The present invention relates to a cell production system including manufacturing cells that manufacture parts according to cell production.

2. Description of the Related Art

Conventionally, devices for production planning have planned the types, number, delivery date, machines used, and manufacturing process of parts to be manufactured. Based on manufacturing plans made by such production planning devices, operators at manufacturing sites have operated manufacturing machines such as machine tools and industrial robots. Moreover, operators at manufacturing sites have transmitted operation information on manufacturing machines and part manufacturing records to production planning devices to perform quality control, process control, etc.

In recent years, the number of part types and a change in sales volume have increased in response to a variety of market needs, a reduction in part life cycle, and fierce competition in global markets. Thus, various part types need to be produced in varying lot sizes so as to manufacture parts while dynamically responding to market needs.

For this reason, cell production has been proposed in which parts are manufactured by each manufacturing cell in each process, the manufacturing cell including multiple manufacturing machines capable of manufacturing multiple part types. In a current cell production system according to the cell production, part types are changed or the number of parts to be manufactured is determined for each manufacturing cell, based on a production plan devised by a production planning device or a scheduling application (e.g., Japanese Unexamined Patent Publication (Kokai) No. 2006-018576).

However, parts which are actually manufacturable by a manufacturing cell at this point, the number of manufacturable parts, parts to be preferentially manufactured, and the number of parts to be preferentially manufactured are changed according to the inventory of the materials of the parts, the progress of an upstream process, the status of a part order, or the operation statuses of the manufacturing machines. Thus, in a current cell production system that manufactures parts based on a production plan devised prior to actual manufacturing, parts cannot be timely manufactured in response to a real-time status change.

SUMMARY OF THE INVENTION

The present invention provides a cell production system that can timely manufacture multiple types of parts in each manufacturing cell according to a status change of, for example, a part order or the inventory of materials.

A first aspect of the present disclosure provides a cell production system including multiple manufacturing cells that perform multiple manufacturing processes, the manufacturing cell including at least one manufacturing machine capable of manufacturing multiple types of parts, a drive controller that controls driving of the manufacturing machine, and a cell controller connected so as to communicate with the drive controller, the cell production system further including an information management device provided with a storage part capable of storing order information including the ordered number and a delivery date of each of the part types, and inventory information on the materials of the part types, the information management device being connected so as to communicate with the cell controllers of the manufacturing cells, wherein the cell controller of the manufacturing cell includes a manufacturing instruction determination part that determines the types of manufacturable parts to be preferentially manufactured and the number of parts to be manufactured, based on the order information and the inventory information that are stored in the storage part, the manufacturing instruction determination part indicating the determination to the drive controller.

According to the cell production system of the first aspect, a second aspect of the present disclosure provides a cell production system in which the order information further includes information on the indicated number of parts to the drive controller and the number of non-defective parts when parts are manufactured based on the indicated number of parts to the drive controller, and the manufacturing instruction determination part increases the indicated number of parts to the drive controller based on the information on the indicated number of parts and the number of non-defective parts when a defective part is found in the manufacturing of parts based on the indicated number parts to the drive controller.

According to the cell production system of the first aspect or the second aspect, a third aspect of the present disclosure provides a cell production system in which the order information includes information on the maximum number of lots for each of the part types, and the manufacturing instruction determination part determines the number of parts based on the information on the maximum number of lots.

According to the cell production system of one of the first to third aspects, a fourth aspect of the present disclosure provides a cell production system in which at completion of manufacturing of the part based on an instruction of the number of parts to the drive controller, the cell controller reflects information on the manufacturing records of the part on the order information and the inventory information that are stored in the storage part.

According to the cell production system of one of the first to fourth aspects, a fifth aspect of the present disclosure provides a cell production system in which the information management device includes an input device capable of adding, changing, and inputting the order information and the inventory information to the storage part.

BRIEF DESCRIPTION OF THE DRAWINGS

A detailed description on a typical embodiment of the present invention shown in the accompanying drawings further clarifies the object, characteristics, advantages of the present invention and other objects, characteristics, and advantages of the present invention.

DETAILED DESCRIPTION

An embodiment of the present disclosure will be described below with reference to the accompanying drawings. In the drawings, the same constituent elements or functional parts are indicated by the same reference characters. To enhance understanding, the scales of these drawings are optionally changed. The illustrated embodiment is merely an example and thus does not limit the present invention.

Figure 1:
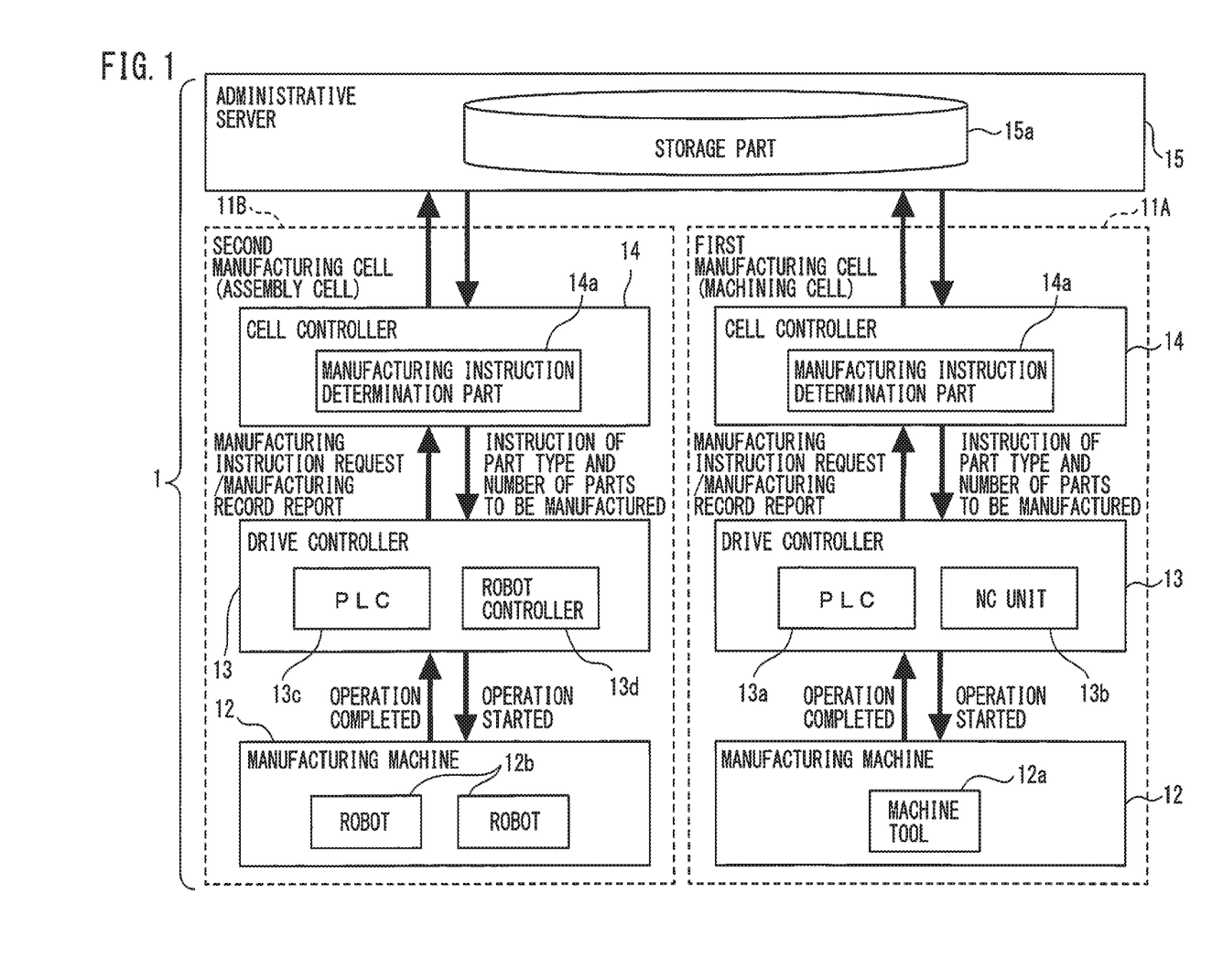
FIG. 1 is a block diagram schematically showing a cell production system according to an embodiment.

FIG. 1 is a block diagram schematically showing a cell production system according to the embodiment.

Referring to FIG. 1, a cell production system 1 according to the present embodiment includes multiple manufacturing cells 11A and 11B that perform multiple manufacturing processes or operations. In this case, "manufacturing process" includes machining and assembly. For example, as shown in FIG. 1, the cell production system 1 includes the first manufacturing cell 11A (machining cell) that performs a machining process in which a workpiece is machined to obtain the components of a part, and the second manufacturing cell 11B (assembly cell) that performs the process of assembling the obtained components into the part. As a matter of course, the two manufacturing cells 11A and 11B may perform the same manufacturing process or operation. The manufacturing cells configured thus can manufacture multiple part types.

The first manufacturing cell 11A and the second manufacturing cell 11B each include at least one manufacturing machine 12 capable of manufacturing multiple part types, a drive controller 13 that controls the driving of the manufacturing machine 12, and a cell controller 14 connected so as to communicate with the drive controller 13.

The manufacturing machine 12 of the first manufacturing cell 11A for performing the machining process is, for example, a numerically controlled machine tool 12a that is configured to perform various kinds of machining by moving an instrument relative to a material (workpiece) held by a holder. In this case, the drive controller 13 in the first manufacturing cell 11A includes a PLC (programmable logic controller) 13a that controls the order of machining performed by the machine tool 12a, a numerical control unit (NC unit) that is connected to the PLC 13a so as to control the machine tool 12a, and an operator's panel 13b.

The manufacturing machine 12 of the second manufacturing cell 11B for performing the assembling process is, for example, a robot 12b that can assemble multiple kinds of parts from components produced by machining materials in the first manufacturing cell 11A. In this case, the drive controller 13 in the second manufacturing cell 11B includes a PLC 13c that controls the order of assembly performed by the robots 12b and a robot controller 13d that is connected to the PLC 13c so as to control the robots 12b. The robot 12b is, for example, a vertical articulated manipulator.

FIG. 1 only shows the two manufacturing cells 11A and 11B but the number of manufacturing cells is not limited to two in the present invention. Furthermore, the drive controller 13 and the manufacturing machine 12 in the manufacturing cells 11A and 11B are not limited to the above-mentioned PLC, robot controller, machine tool, and robot.

Moreover, as shown in FIG. 1, the cell controllers 14 of the manufacturing cells 11A and 11B are connected so as to communicate with an administrative server 15 (information management device). The administrative server 15 includes a storage part (database part) 15a that can store order information including the ordered number of parts and the delivery dates of multiple part types and inventory information on the materials of the part types. The administrative server 15 is preferably a manufacturing control host computer. Moreover, the administrative server 15 is preferably connected to an input device (not shown), e.g., a keyboard or a DVD drive and an output device (not shown), e.g., a monitor or a printer. The output device can provide notification of the order information and the material inventory information that are stored in the storage part 15a, to the outside of the administrative server 15. The input device can add, change, and input order information and material inventory information to the storage part 15a. The administrative server 15 may be configured to communicate data with computers other than the cell controller 14.

In each of the first manufacturing cell 11A and the second manufacturing cell 11B, the drive controller 13 is configured to request a manufacturing instruction from the cell controller 14 and receive, as a manufacturing instruction, the types of parts to be manufactured and the number of parts to be manufactured.

The drive controller 13 is configured to transmit an operation start command to the manufacturing machine 12, for example, the machine tool 12a or the robot 12b based on the received manufacturing instruction and receive an operation completion command from the manufacturing machine 12. Moreover, when receiving the operation completion command from the manufacturing machine 12, the drive controller 13 reports information on the manufacturing records of the manufacturing machine 12, for example, the number of non-defective parts, the number of defective parts, the number of uses of materials, etc., to the cell controller 14.

The cell controller 14, in particular, includes a manufacturing instruction determination part 14a that determines a manufacturing instruction for the drive controller 13, specifically, the types of parts to be manufactured and the number of parts to be manufactured, in response to a request from the drive controller 13.

Based on the order information and the material inventory information that are stored in the storage part 15a of the administrative server 15, the manufacturing instruction determination part 14a determines the types of manufacturable parts to be preferentially manufactured and the number of parts, and the manufacturing instruction determination part 14a then indicates the determination to the drive controller 13.

In this case, "parts to be preferentially manufactured" means parts to be ordered at the highest priority, whereas "manufacturable parts" means parts whose materials are all available in stock.

Each of the administrative server 15, the manufacturing machine 12, the drive controller 13, and the cell controller 14 preferably includes a computer system (not shown) provided with a memory, e.g., a ROM or a RAM, a CPU, and a communication control part (not shown) that are connected to one another via a bus. Moreover, the functions and operations of the administrative server 15, the manufacturing machine 12, the drive controller 13, and the cell controller 14 are preferably achieved by programs stored in the respective ROMs, the programs being executed by the respective CPUs.

Furthermore, application software (program) that causes the computer system to function as the manufacturing instruction determination part 14*a* is preferably stored in the ROM included in the computer system constituting the cell controller 14. The function and operation of the manufacturing instruction determination part 14*a* are preferably performed by the CPU in the cell controller 14 in synchronization with the administrative server 15 and the drive controller 13 based on the program stored in the ROM.

The manufacturing cells 11A and 11B are disposed in, for example, a manufacturing factory for manufacturing parts, whereas the administrative server 15 is disposed in the manufacturing factory or a different building in the site of the manufacturing factory. In this case, the manufacturing cells 11A and 11B and the administrative server 15 are preferably connected so as to communicate with each other via, for example, a wired or wireless intranet.

Alternatively, the administrative server 15 may be disposed in, for example, an office remote from the manufacturing factory. In this case, the manufacturing cells 11A and 11B and the administrative server 15 are preferably connected so as to communicate with each other via the Internet. The administrative server 15 in this case is preferably a cloud computer.

Figure 2A:
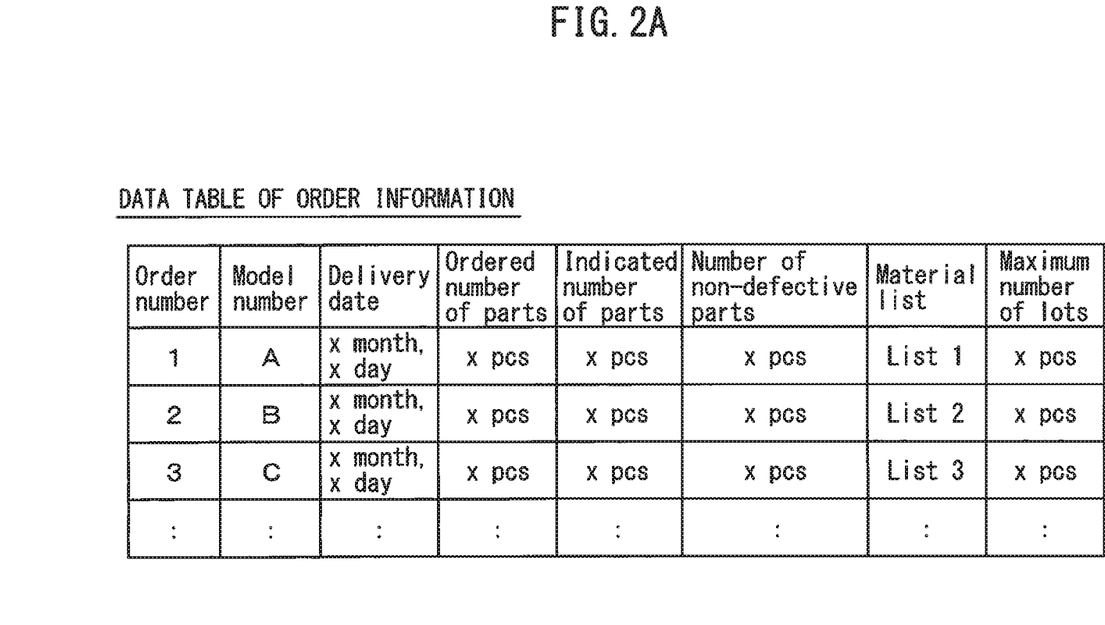
FIG. 2A illustrates a data table of order information stored in the storage part of an administrative server shown in FIG. 1.

FIG. 2A shows a data table of the order information stored in the storage part 15*a* of the administrative server 15.

As shown in FIG. 2A, the order information is stored for each part in the storage part 15*a* of the administrative server 15 in the form of a data table. The order information includes an order number, a model number, a delivery date, the ordered number of parts, the indicated number of parts, the number of non-defective parts, a material list, and the maximum number of lots.

In other words, the order information includes information on the indicated number of parts indicated to the drive controller 13 and the number of non-defective parts when parts are manufactured based on the indicated number of parts to the drive controller 13 in addition to the ordered number of parts and delivery date of each part type. In this case, "the indicated number of parts" means the number of parts indicated from the cell controller 14 to the drive controller 13, "the number of non-defective parts" means the number of non-defective parts out of parts manufactured based on an instruction to the drive controller 13, and "the maximum number of lots" means the maximum number of manufacturable parts for each instruction.

In the present embodiment, defective parts may be found in the manufacturing of parts indicated to the drive controller 13 and thus the number of non-defective parts may not reach the indicated number of parts to be manufactured. In this case, the production of the indicated parts must be raised to increase the number of non-defective parts. Thus, as shown in FIG. 2A, the indicated number of parts and the number of non-defective parts are stored in the data table of the order information in the storage part 15*a*, allowing a decision on whether to increase the production of parts.

More specifically, when defective parts are found as described above, the manufacturing instruction determination part 14*a* of the cell controller 14 increases the indicated number of parts to the drive controller 13, based on the indicated number of parts and the number of non-defective parts in the storage part 15*a*.

Figure 2B:
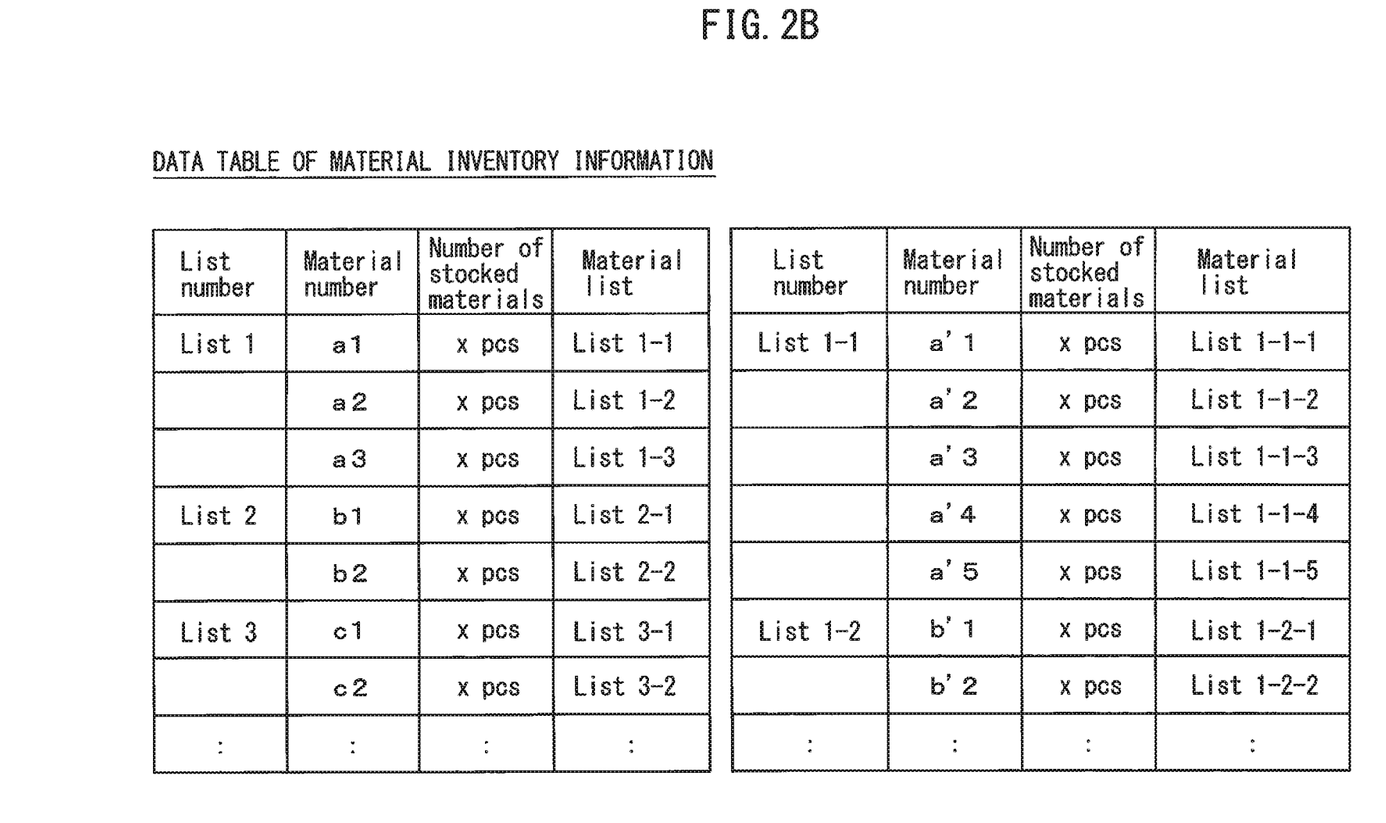
FIG. 2B illustrates a data table of material inventory information stored in the storage part of the administrative server shown in FIG. 1.

FIG. 2B illustrates a data table of the material inventory information stored in the storage part 15*a* of the administrative server 15. The storage part 15*a* of the administrative server 15 stores inventory information on the materials of the parts. In this case, "materials" include all materials such as workpieces, components, solid materials, and liquid materials that are necessary for manufacturing parts. The material inventory information is stored in association with the material lists (FIG. 2A) of the order information.

Specifically, as shown in FIG. 2B, the material inventory information including a list number, a material number, the number of stocked materials, and a material list is stored in the storage part 15*a* of the administrative server 15 in the form of a data table for each of the material lists of parts. In the case of a part composed of multiple materials, the material list of the part includes inventory information on the materials of the part. For example, list 1 in FIG. 2B relates to inventory information on the materials of the part of model number A shown in FIG. 2A. As is evident from the left data table of FIG. 2B, the part of list 1 (model number A) is composed of three materials of material numbers a1 to a3. The number of stocked materials and the material list are stored in association with each other. If the materials are each composed of multiple materials, inventory information on the multiple materials is also stored in another material list. For example, as is evident from the right data table of FIG. 2B, the material of list 1-1 (material number a1) includes five materials with material numbers a'1 to a'5. The number of stocked materials and each list of the multiple materials (lists 1-1-1 to 1-1-5) are stored in association with each other.

Moreover, in the present embodiment, the input device connected to the administrative server 15 can add, change, and input the order information and the material inventory information to the data tables in the storage part 15*a* of the administrative server 15.

For example, regarding the two manufacturing cells 11A and 11B in FIG. 1, the first manufacturing cell 11A machines workpieces to produce parts and the second manufacturing cell 11B then assembles the parts produced by the first manufacturing cell 11A into a finished product. If the two manufacturing cells 11A and 11B are set for an upstream process and a downstream process, respectively, order information on components to be manufactured by the first manufacturing cell 11A needs to be inputted beforehand to the data table in the administrative server 15. When it is found that components for assembling the finished product are not all available in stock in the second manufacturing cell 11B, it is desirable to preferentially manufacture necessary components in the first manufacturing cell 11A. Thus, the storage part 15*a* of the administrative server 15 is configured such that the input device can add order information and material inventory information or change the priority of order at any time.

The operation of the cell production system 1 according to the present embodiment will be described below.

First, a process flow of instructing the manufacturing machines 12 in the manufacturing cells 11A and 11B to perform operations such as machining and assembly.

Figure 3:
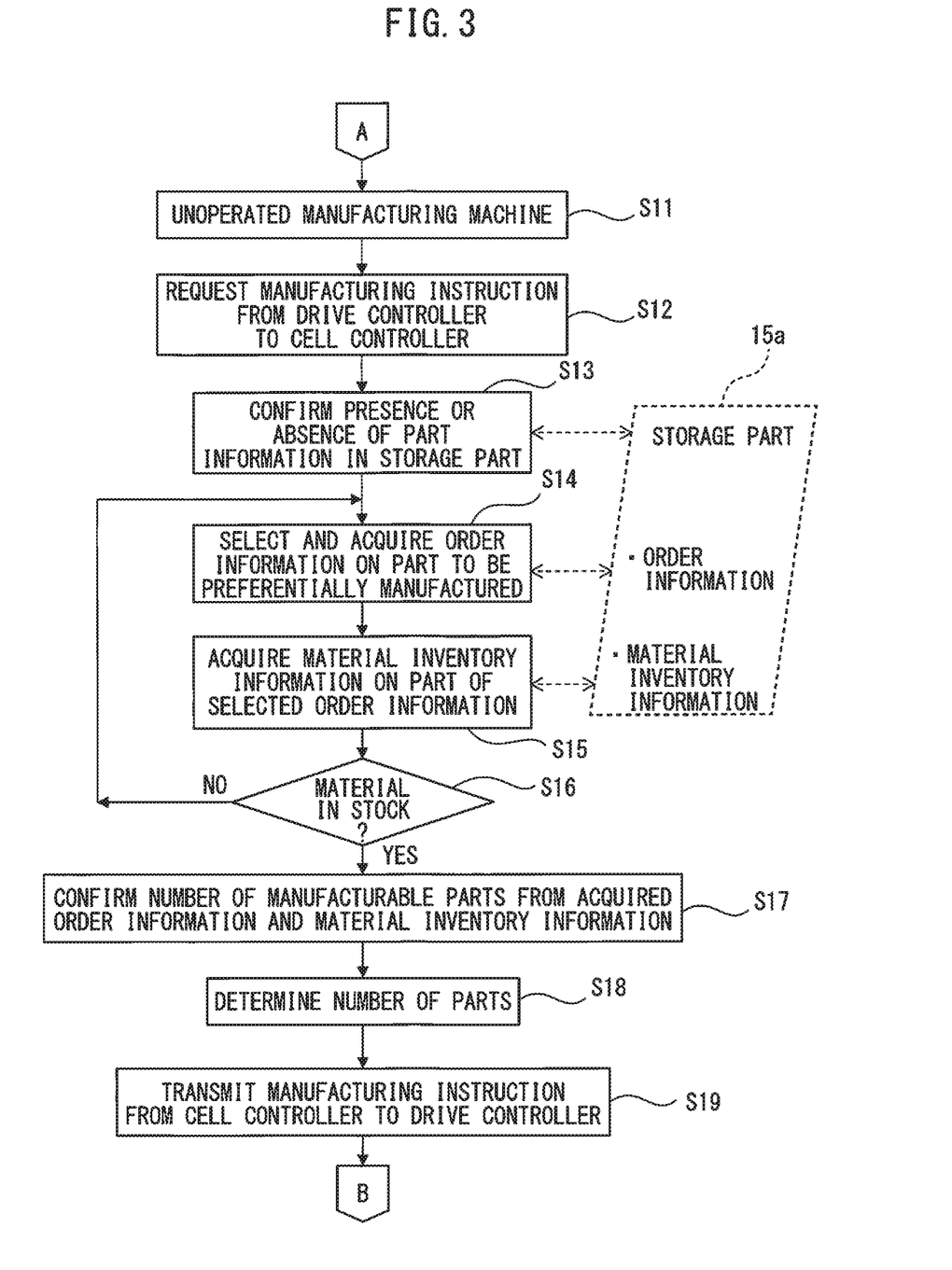
FIG. 3 is a flowchart showing a process flow in which the cell production system of the embodiment instructs manufacturing machines in manufacturing cells to perform operations.

FIG. 3 is a flowchart of a process flow in which the cell production system 1 instructs the manufacturing machines 12 in the manufacturing cells 11A and 11B to perform the operations. The process flow indicates part types to be manufactured by the manufacturing machines 12 in the manufacturing cells 11A and 11B and the number of parts to be manufactured.

First, in step S11 of FIG. 3, when the manufacturing machine 12 is not operated, the drive controller 13 requests a manufacturing instruction from the cell controller 14 in step S11 of FIG. 3. The drive controller 13 including the PLC 13a, the NC unit 13b, or the robot controller 13d can receive an operation completion command from the manufacturing machine 12 and thus can recognize whether the manufacturing machine 12 is not operated.

Subsequently, in step S13 of FIG. 3, the manufacturing instruction determination part 14a of the cell controller 14 confirms whether the storage part 15a of the administrative server 15 contains information on parts to be manufactured. Specifically, the manufacturing instruction determination part 14a confirms whether order information or material inventory information has been inputted to the data tables shown in FIGS. 2A and 2B. In the absence of order information and material inventory information in the storage part 15a, it is desirable to prompt entry of order information and material inventory information through an output device (not shown), e.g., a monitor or a printer that is connected to the administrative server 15.

In the presence of order information and material inventory information in the storage part 15a, in step S14 of FIG. 3, order information on a part type to be preferentially manufactured is selected and acquired by the manufacturing instruction determination part 14a from order information on multiple part types in the storage part 15a. For example, in view of delivery dates included in the part order information shown in FIG. 2A, the manufacturing instruction determination part 14a acquires order information on a part with the nearest delivery date.

Subsequently, in step S15 of FIG. 3, the manufacturing instruction determination part 14a acquires inventory information on the materials of the part of the selected order information (FIG. 2B) from the storage part 15a of the administrative server 15. After that, the inventory is confirmed based on material numbers and the number of stocked materials, which are included in the acquired material inventory information (Step S16 in FIG. 3). If the materials are not available, steps S14 and S15 are performed again. At this point, for example, in the absence of the materials of the part of the selected order information, the manufacturing instruction determination part 14a acquires order information and material inventory information on another part to be delivered subsequent to the part of the unavailable materials.

If it is decided in step S16 that the materials are available, step S17 of FIG. 3 is performed. In step S17, the manufacturing instruction determination part 14a confirms the number of manufacturable parts (Hereinafter will be called the number (P) of manufacturable parts) of the selected order information based on the acquired material inventory information.

For example, if the part of model number A includes the three materials of material numbers a1 to a3 as shown in FIGS. 2A and 2B, 100 items of material number a1 are stocked, 200 items of material number a2 are stocked, and 300 items of material number a3 are stocked. In this case, the manufacturing instruction determination part 14a determines that the number (P) of manufacturable parts of model number A is 100.

After that, in step S18 of FIG. 3, the manufacturing instruction determination part 14a determines the number (S) of parts based on the acquired order information and material inventory information. The number of parts is to be indicated to the drive controller 13. The determined number (S) of parts is stored as "the indicated number of parts" in the data table of order information in the storage part 15a of the administrative server 15 (FIG. 2A).

At this point, if the maximum number of lots is determined beforehand for the manufacturing order of each part as shown in FIG. 2A, the manufacturing instruction determination part 14a preferably determines the number (S) to be indicated, from the order information including the maximum number (L) of lots and the material inventory information. For example, in the process flow of steps S17 to S18, if the number (P) of manufacturable parts is not smaller than the maximum number (L) of lots in the order information, the number (S) to be indicated is determined as the maximum number (L) of lots. If the number (P) of manufacturable parts is smaller than the maximum number (L) of lots in the order information, the number (S) to be indicated is determined as the number (P) of manufacturable parts.

Subsequently, in step S19 of FIG. 3, a manufacturing instruction is transmitted from the cell controller 14 to the drive controller 13. Specifically, the manufacturing instruction determination part 14a indicates a part type to be manufactured and the number (P) of parts to the drive controller 13. At this point, the manufacturing instruction to the drive controller 13 also includes a material to be used for manufacturing the part and the number of uses of the material in addition to the part to be manufacture and the number (P) of parts.

As indicated by the process flow, in the present embodiment, the cell controllers 14 of the manufacturing cells 11A and 11B select parts that are currently manufacturable and are to be preferentially manufactured, from the order information and the material inventory information in the administrative server 15 before the manufacturing of the parts. More specifically, the cell controller 14 determines a part type to be manufactured and the number of parts to be manufactured, based on the order information and the material inventory information in the administrative server 15, and then the cell controller 14 indicates the determination to the drive controller 13 of the manufacturing machine 12 (FIG. 3 and steps S13 to S19).

In other words, unlike the related art, the cell controller 14 of the present embodiment does not operate the manufacturing machines 12 of the manufacturing cells 11A and 11B based on a production plan made by a production planning device. The cell controller 14 autonomously manufactures parts based on the current order status and inventory of materials. "Autonomously" means that possible operations to be performed by the manufacturing cells are determined only by order information and material inventory information regardless of the progress of an upstream process and a downstream process.

Thus, even if parts actually manufacturable by the manufacturing cell at this point, the number of parts, parts to be preferentially manufactured, and the number of parts are changed according to the inventory of materials, the progress of an upstream process, the status of a part order, or the operation statuses of the manufacturing machines, the parts can be manufactured in a timely manner.

Moreover, in the cell production system 1 of the present embodiment, a manufacturing instruction is determined regardless of the progress of the manufacturing cells 11A and 11B. Specifically, in the present embodiment, the progress of the manufacturing cells 11A and 11B is reflected on the number of stocked materials, and thus only the material inventory information in the storage part 15a of the administrative server 15 needs to be confirmed in the determination of a manufacturing instruction to each of the manufacturing cells (Step S17 in FIG. 3).

A process flow of operating the manufacturing machines 12 in the manufacturing cells 11A and 11B according to a manufacturing instruction will be discussed below.

Figure 4:
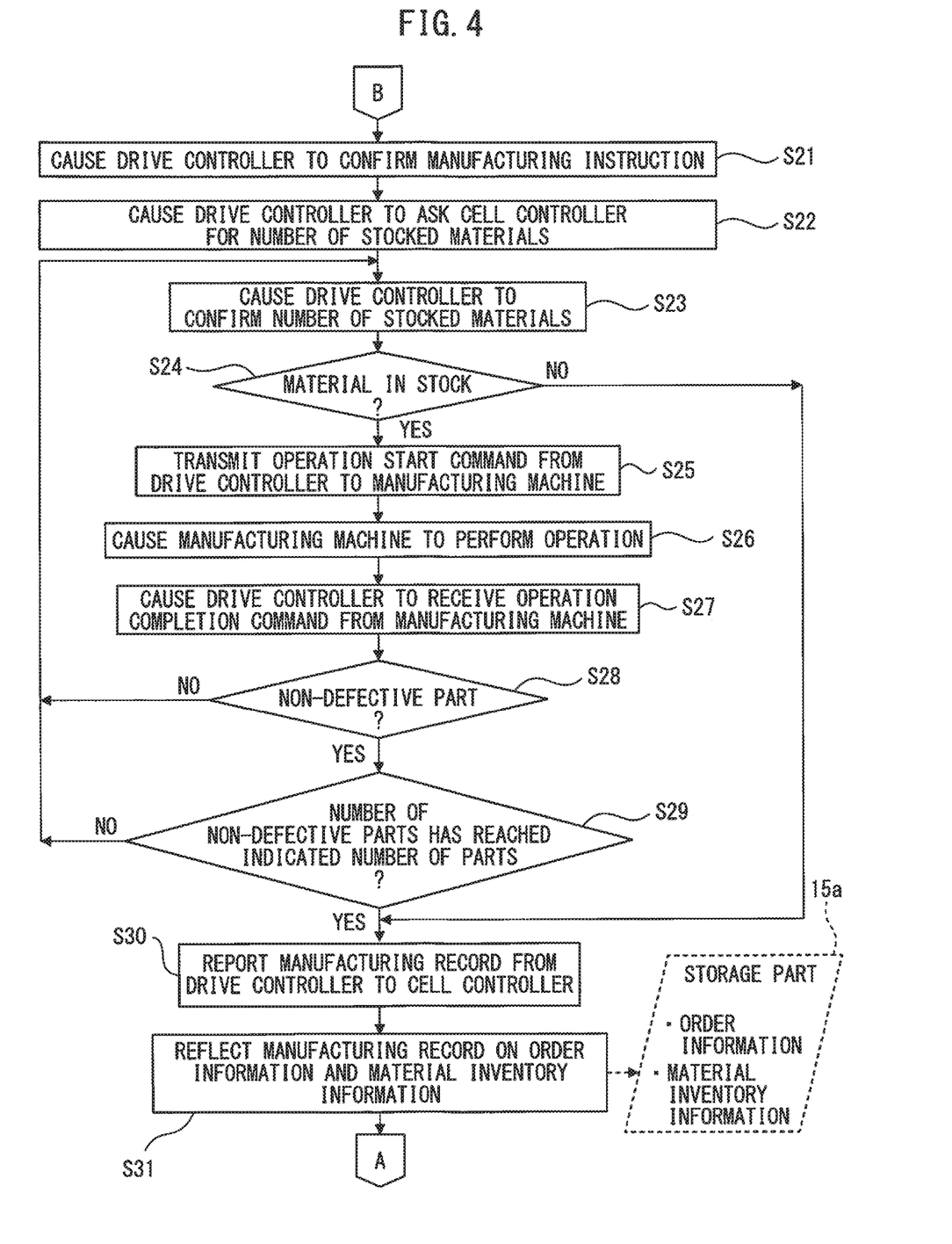
FIG. 4 is a flowchart showing a process flow in which the cell production system of the embodiment operates the manufacturing machines in the manufacturing cells according to a manufacturing instruction.

FIG. 4 is a flowchart showing a process flow in which the cell production system 1 operates the manufacturing machines 12 in the manufacturing cells 11A and 11B according to a manufacturing instruction. In this process flow, operations are performed by the manufacturing machines 12 in the manufacturing cells 11A and 11B based on the manufacturing instruction determined by the process flow of FIG. 3. In other words, the start of the process flow of FIG. 4 is connected to the end of the process flow of FIG. 3 (Reference character B in FIGS. 3 and 4). Moreover, the end of the process flow of FIG. 4 is connected to the start of the process flow of FIG. 3 (Reference character A in FIGS. 3 and 4).

First, in step S21 of FIG. 4, the drive controller 13 confirms a manufacturing instruction transmitted from the cell controller 14. Subsequently, the drive controller 13 asks the cell controller 14 for the number of stocked materials for manufacturing a part to be manufactured (Step S22 in FIG. 4). The number of stocked materials of the part to be manufactured has been already acquired by the cell controller 14 in step S15.

Moreover, in step S23 of FIG. 4, the drive controller 13 confirms the number of stocked materials of the part to be manufactured. After that, the availability of the materials is determined based on information on the number of stocked materials (Step S24 in FIG. 4). If it is determined in step S24 that the materials are unavailable, a process flow subsequent to step S30 is performed, which will be discussed later.

If it is determined in step S24 that the materials are available, processing in step S25 of FIG. 4 is performed. Specifically, the drive controller 13 transmits an operation start command to the manufacturing machine 12, e.g., the machine tool 12a or the robot 12b based on the number of parts to be manufactured. Thus, in step S26 of FIG. 4, the manufacturing machine 12 performs an operation, e.g., machining or assembly. After the completion of the operation, in step S27 of FIG. 4, the drive controller 13 receives an operation completion command from the manufacturing machine 12.

Subsequently, in step S28 of FIG. 4, it is determined whether the part manufactured by the manufacturing machine 12 is a non-defective part or a defective part. For this determination, an inspection device (not shown) that inspects a manufactured part and outputs the inspection result to the drive controller 13 is preferably disposed in the manufacturing machine 12. If it is determined in step S28 that the manufactured part is defective, steps S23 to S27 are performed again. In other words, a part to be manufactured is manufactured again by the manufacturing machine 12.

In step S28, if it is determined that the manufactured part is a non-defective part, the process of step S29 in FIG. 4 is performed. Specifically, the number of non-defective parts and the number of defective parts are counted and then the drive controller 13 determines whether the number of non-defective parts has reached the indicated number of parts (the indicated number of parts to be manufactured). In the determination of step S29, if the number of non-defective parts has not reached the indicated number of parts, steps S23 to S28 are performed again. Specifically, even after manufacturing of the predetermined number of parts to be manufactured, parts to be manufactured are additionally manufactured until the number of non-defective parts reaches the indicated number of parts. In step S29, if the number of non-defective parts has reached the indicated number of parts, the process of step S30 in FIG. 4 is performed. Specifically, the drive controller 13 reports, for example, the number of non-defective parts, the number of defective parts, and the number of uses of materials, which have been obtained by the above-mentioned process flows, as manufacturing records to the cell controller 14.

Subsequently, in step S31 of FIG. 4, information on the manufacturing records including the number of non-defective parts, the number of defective parts, and the number of uses of materials, which have been reported to the cell controller 14, is transmitted to the administrative server 15, and the information is then reflected on the order information and the material inventory information in the storage part 15a of the administrative server 15. For example, the number of non-defective parts is written in the data table of the order information in FIG. 2A. Moreover, the number of stocked materials in the data table of the material inventory information in FIG. 2B is changed according to the number of uses of materials.

The above-mentioned cell production system 1 can obtain the following effects:

According to the cell production system 1, the cell controller 14 in each of the manufacturing cells 11A and 11B can determined a manufacturing instruction to the manufacturing machine 12 based on the current order information and material inventory information. Thus, multiple part types can be timely manufactured by the manufacturing cells 11A and 11B according a status change of, for example, a part order or the inventory of materials.

Furthermore, possible operations to be performed by the manufacturing cells 11A and 11B are determined only by the order information and the material inventory information regardless of the progress of the manufacturing cells 11A and 11B.

When the same manufacturing process or operation is performed by the multiple manufacturing cells, even if a fault occurs in, for example, the manufacturing machine in one of the manufacturing cells, other normal manufacturing cells can manufacture an ordered type of parts and the ordered number of parts without the need for identifying the fault.

Moreover, as shown in FIG. 2A, the order information includes information on the indicated number of parts to the drive controller 13 and the number of non-defective parts when parts are manufactured according to the instruction to the drive controller 13. Thus, even if a defective part is found in the manufacturing of parts according to an instruction of the number of parts to the drive controller 13, the cell production system 1 can manufacture as many non-defective parts as the determined number of parts based on the order information.

The order information also includes information on the maximum number of lots. Thus, the cell production system 1 can determine, for each manufacturable part, the number of manufacturable parts in consideration of the information on the maximum number of lots in the order information. For example, even when the manufacturing cells 11A and 11B perform the same operation, parts of manufacturable types at this point are manufactured as many as possible in the manufacturing cells 11A and 11B, thereby finally reaching the ordered number of parts.

Moreover, the cell controllers 14 of the manufacturing cells reflect information on manufacturing records in the manufacturing cells on the order information and the material inventory information in the administrative server 15 shared by the manufacturing cells, the reflected information including the number of non-defective parts, the number of defective parts, and the number of uses of materials (Step S31 in FIG. 4). Thus, a change of the number of stocked materials in the manufacturing of a part in one of the manufacturing cells can be timely reflected on a manufacturing instruction to the manufacturing machines of other manufacturing cells.

Moreover, in the cell production system 1, order information and material inventory information can be added, changed, and inputted at any time to the storage part 15a of the administrative server 15 from an input device, e.g., a keyboard connected the administrative server 15.

The operations of the administrative server 15, the manufacturing machine 12, the drive controller 13, and the cell controller 14 with reference to FIGS. 3 and 4 can be implemented when the CPU executes operation programs that define the respective operations.

The present invention was described according to the typical embodiment. A person skilled in the art could understand that the embodiment can be changed and various other changes, omissions, and additions may be made without departing from the scope of the present invention.

According to a first aspect of the present disclosure, unlike in the related art, the manufacturing machines of the manufacturing cells are not operated based on a production plan devised by a production planning device. Instead, the cell controller of the manufacturing cell can determine a manufacturing instruction to the manufacturing machine based on the current order information and material inventory information. This allows the manufacturing cells to timely manufacture multiple types of parts according to a status change of, for example, a part order or the inventory of materials.

Furthermore, possible operations to be performed by the manufacturing cells can be implemented only based on order information and material inventory information regardless of the progress of the manufacturing cells.

When the same manufacturing process or operation is performed by the multiple manufacturing cells, even if a fault occurs in, for example, the manufacturing machine in one of the manufacturing cells, other normal manufacturing cells can manufacture an ordered type of parts and the ordered number of parts without the need for identifying the fault.

According to a second aspect of the present disclosure, even if a defective part is found in the manufacturing of parts according to an instruction of the number of parts to be manufactured to the drive controller, as many non-defective parts can be manufactured as the determined number of parts based on the order information.

According to a third aspect of the present disclosure, the number of manufacturable parts can be determined for each manufacturable part in consideration of the information on the maximum number of lots included in the order information.

According to a fourth aspect of the present disclosure, information on manufacturing records in the manufacturing cells is reflected on the order information and the material inventory information in the information management device connected to the cell controllers of the manufacturing cells. Thus, a change of the number of stocked materials in the manufacturing of a part in one of the manufacturing cells can be timely reflected on a manufacturing instruction to the manufacturing machines of other manufacturing cells.

According to a fifth aspect of the present disclosure, order information and material inventory information can be added, changed, and inputted at any time to the storage part of the information management device.

The invention claimed is:

1. A cell production system, comprising:
   multiple manufacturing cells configured to perform multiple manufacturing processes, each of the manufacturing cells including
      at least one manufacturing machine configured to manufacture multiple types of parts,
      a drive controller configured to control driving of the manufacturing machine, and
      a cell controller connected so as to communicate with the drive controller; and
   an information management device including at least one memory configure to store order information including the ordered number and a delivery date of each of the part types, and inventory information on materials of the part types, the information management device being connected so as to communicate with the cell controllers of the manufacturing cells,
   wherein the cell controller of each of the manufacturing cells includes a processor configured to determine and indicate to the drive controller, the types of manufacturable parts to be preferentially manufactured and the number of parts to be manufactured, only based on information consisting of the order information and the inventory information that are stored in the at least one memory, and regardless of the progress of the manufacturing cells,
   the order information further includes information on the indicated number of parts to be manufactured to the drive controller and the number of non-defective parts when parts are manufactured based on the indicated number of parts to be manufactured to the drive controller, and
   the processor is configured to increase the indicated number of parts to be manufactured to the drive controller based on the information on the indicated number of parts to be manufactured and the number of non-defective parts when each defective part is found in the manufacturing of parts based on the indicated number of parts to be manufactured to the drive controller.

2. The cell production system according to claim 1, wherein
   the order information includes information on the maximum number of manufacturable parts for each instruction for each of the part types, and
   the processor is configured to determine the number of parts to be manufactured based on the information on the maximum number of manufacturable parts for each instruction.

3. The cell production system according to claim 1, wherein at completion of manufacturing of the part based on an instruction of the number of parts to be manufactured to the drive controller, the cell controller is adapted to reflect information on manufacturing records of the part on the order information and the inventory information that are stored in the at least one memory.

4. The cell production system according to claim 1, wherein the processor is configured to accept an input of adding, changing, and inputting the order information and the inventory information to the at least one memory.

5. The cell production system according to claim 1, wherein a manufacturable part to be preferentially manufactured is a part with a nearest delivery date.

6. The cell production system according to claim 1, wherein when a number of manufacturable parts is not smaller than a maximum number of manufacturable parts for each instruction in the order information, the processor is configured to determine that the number of parts to be manufactured and indicated to the drive controller is the maximum number of manufacturable parts for each instruction, and when the number of manufacturable parts is smaller than the maximum number of manufacturable parts for each instruction in the order information, the processor is configured to determine that the number of parts to be manufactured and indicated to the drive controller is the number of manufacturable parts.

* * * * *